Figure 1:
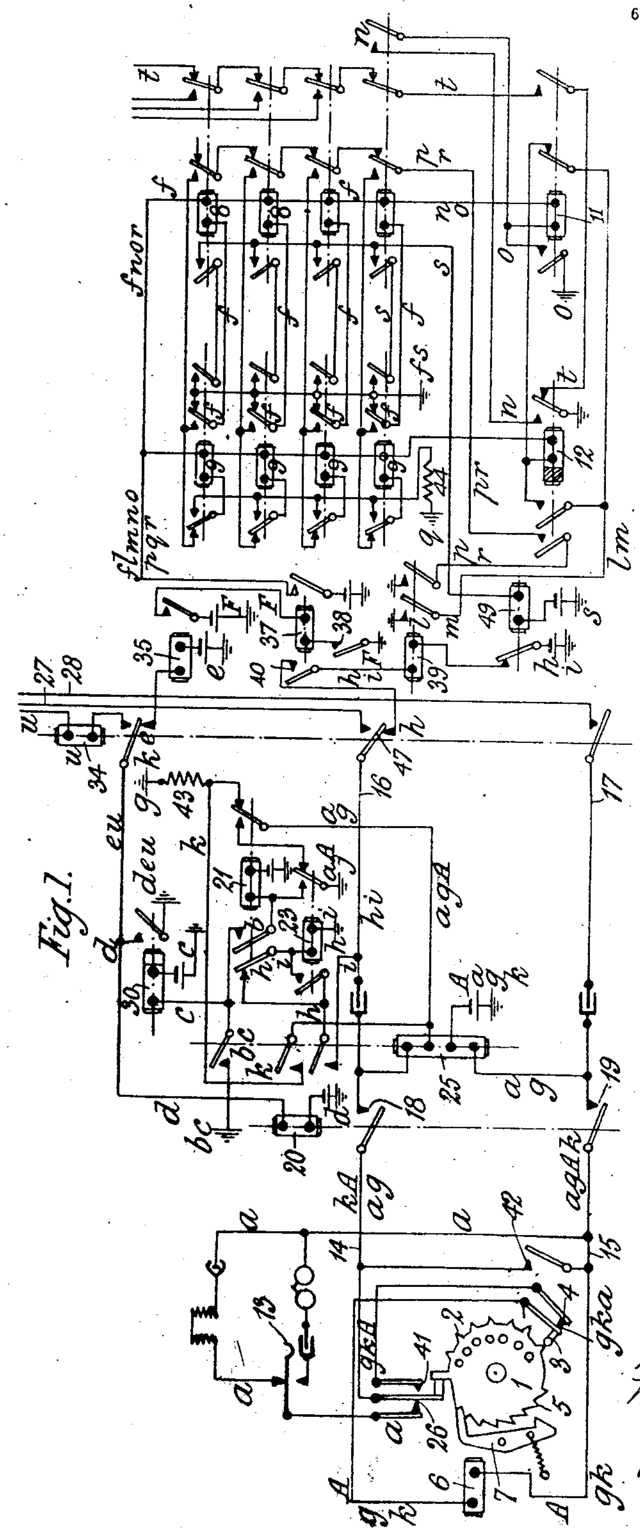

A. BETULANDER, N. G. PALMGREN & O. GRAHN.

AUTOMATIC OR SEMI-AUTOMATIC TELEPHONE SYSTEM.

APPLICATION FILED JULY 12, 1915.

1,187,806.

Patented June 20, 1916.

6 SHEETS—SHEET 1.

Inventors:
G. A. Betulander
N. G. Palmgren
Oscar Grahn
By their Attorneys
Baldwin & Wight G. A. BETULANDER, N. G. PALMGREN & O. GRAHN.
AUTOMATIC OR SEMI-AUTOMATIC TELEPHONE SYSTEM.
APPLICATION FILED JULY 12, 1915.

1,187,806. Patented June 20, 1916.

6 SHEETS—SHEET 2.

Inventors:
G. A. Betulander
N. G. Palmgren,
Oscar Grahn
By their Attorneys
Baldwin & Wight.

G. A. BETULANDER, N. G. PALMGREN & O. GRAHN.

AUTOMATIC OR SEMI-AUTOMATIC TELEPHONE SYSTEM.

APPLICATION FILED JULY 12, 1915.

1,187,806.

Patented June 20, 1916.

6 SHEETS—SHEET 3.

Inventors
G. A. Betulander
N. G. Palmgren
Oscar Grahn
by their attorney
Baldwin Wight G. A. BETULANDER, N. G. PALMGREN & O. GRAHN.
AUTOMATIC OR SEMI-AUTOMATIC TELEPHONE SYSTEM.
APPLICATION FILED JULY 12, 1915.

1,187,806. Patented June 20, 1916.

6 SHEETS—SHEET 4.

Inventors:
G. A. Betulander
N. G. Palmgren
Oscar Grahn
By their Attorney
Baldwin Wight

G. A. BETULANDER, N. G. PALMGREN & O. GRAHN.

AUTOMATIC OR SEMI-AUTOMATIC TELEPHONE SYSTEM.

APPLICATION FILED JULY 12, 1915.

1,187,806. Patented June 20, 1916.

6 SHEETS—SHEET 5.

Inventors.
G. A. Betulander
N. G. Palmgren
Oscar Grahn
By their Attorney
Baldwin Wight G. A. BETULANDER, N. G. PALMGREN & O. GRAHN.
AUTOMATIC OR SEMI-AUTOMATIC TELEPHONE SYSTEM.
APPLICATION FILED JULY 12, 1915.

1,187,806. Patented June 20, 1916.

6 SHEETS—SHEET 6.

Inventors
G. A. Betulander
N. G. Palmgren
Oscar Grahn
By Their Attorneys
Baldwin Wight

UNITED STATES PATENT OFFICE.

GOTTHILF ANSGARIUS BETULANDER, OF SÖDERTÖRNS VILLASTAD, SWEDEN, NILS GUNNAR PALMGREN, OF LONDON, ENGLAND, AND OSCAR GRAHN, OF STOCKHOLM, SWEDEN, ASSIGNORS TO RELAY AUTOMATIC TELEPHONE COMPANY, LIMITED, OF LONDON, ENGLAND.

AUTOMATIC OR SEMI-AUTOMATIC TELEPHONE SYSTEM.

1,187,806. Specification of Letters Patent. Patented June 20, 1916.

Application filed July 12, 1915. Serial No. 39,422.

*To all whom it may concern:*

Be it known that we, GOTTHILF ANSGARIUS BETULANDER, NILS GUNNAR PALMGREN, and OSCAR GRAHN, subjects of the King of Sweden, residing, respectively, at Villa Castor, Södertörns Villastad, Sweden; Marconi House, Strand, London, England, and 32 Odingatan, Stockholm, Sweden, have invented new and useful Improvements in Automatic or Semi-Automatic Telephone Systems, of which the following is a specification.

The invention relates to automatic or semi-automatic telephone systems of the class in which the selectors are set by means of number-switches electro-magnetically controlled from the exchange without the use of any connection to earth at the sending place. Systems of this class are already known in which the number-switch, after having been set, is returned to normal by means of current impulses sent from the exchange and at the same time operating the selector, the number of impulses being determined by changes in the loop circuit made at the beginning and at the end of the return movement of the number-switch.

According to one form of the present invention the setting of the selectors is effected by means of impulses, sent from the subscriber's station and operating an impulse relay included in the loop circuit, said impulse relay and the controlling magnet of the number-switch being operated by variations of current in the loop circuit. By "variations" it is intended to include variations down to zero, in other words interruptions of the current. This arrangment gives a more simple and reliable series of operations and also provides a step by step reciprocal control of the number-switch and the selector. Preferably the impulse relay is operated from the subscriber's station through interruptions of the loop circuit, while the controlling magnet of the number-switch is operated from the exchange by varying the current, but different degrees of current variation may also be used to operate the impulse relay and the controlling magnet without the loop circuit being interrupted. The number-switch may be controlled from the exchange either step by step or according to another form of the invention in such a manner that it is only started from the exchange, the selective impulses being then emitted from the subscriber's station in the usual uncontrolled manner.

The invention may also be applied with only slight modifications to semi-automatic systems, the impulse transmitter of the operator being then substituted for the number-switch of the subscriber.

The accompanying diagrammatic drawings show various modifications of the invention which is illustrated as applied to a system in which the connections are established by means of relays only.

Figure 2:
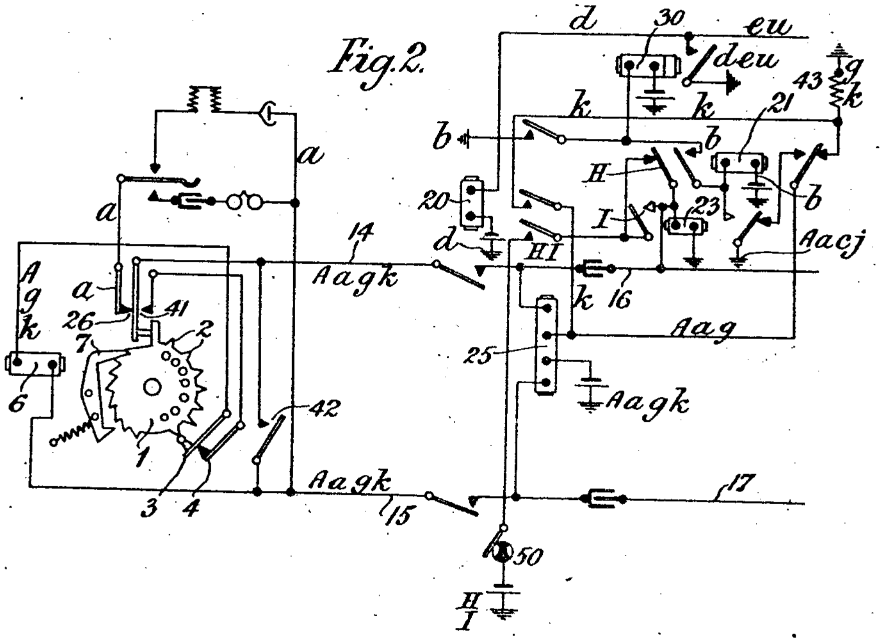
Figure 3:
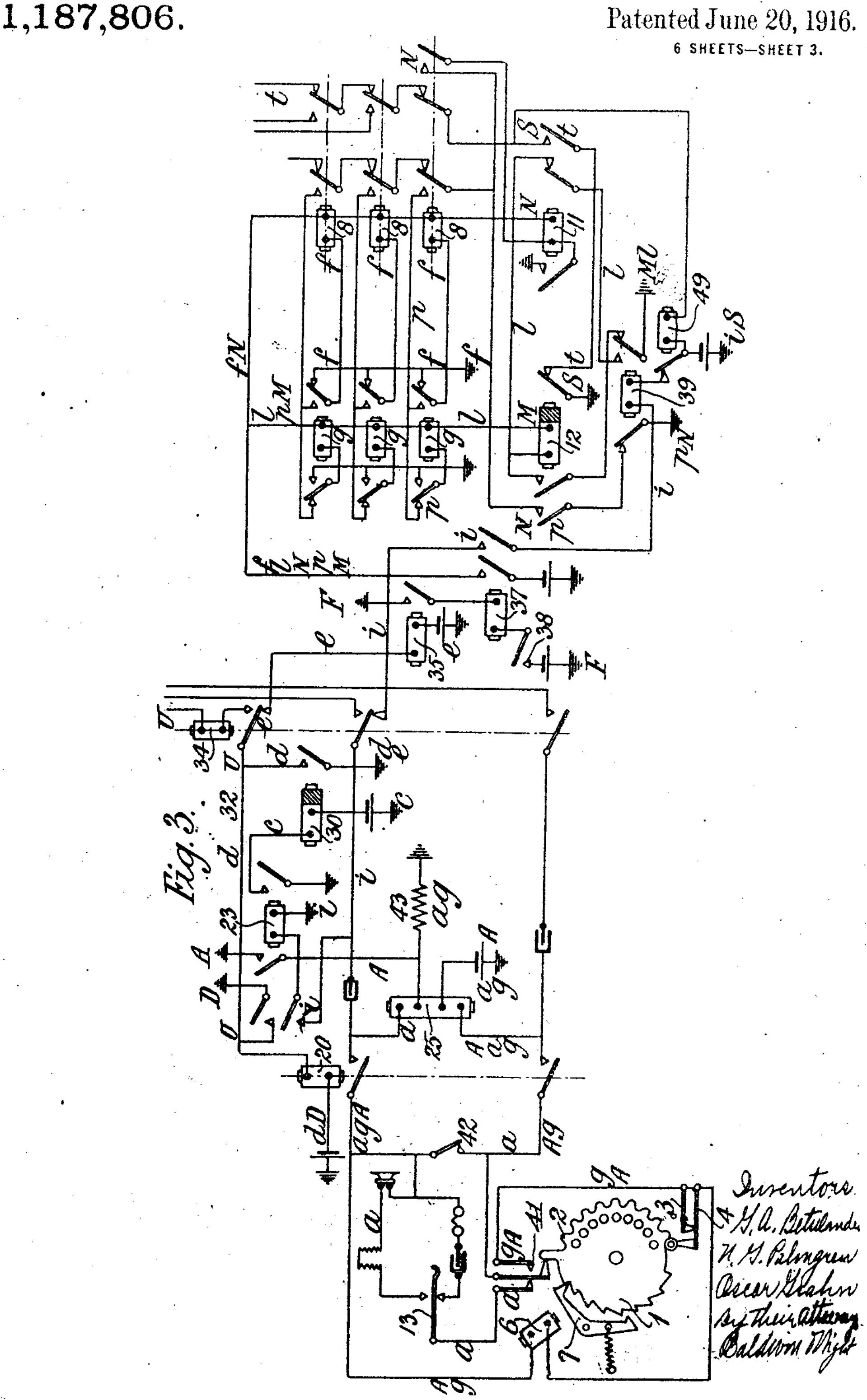
Figures 4, 5:
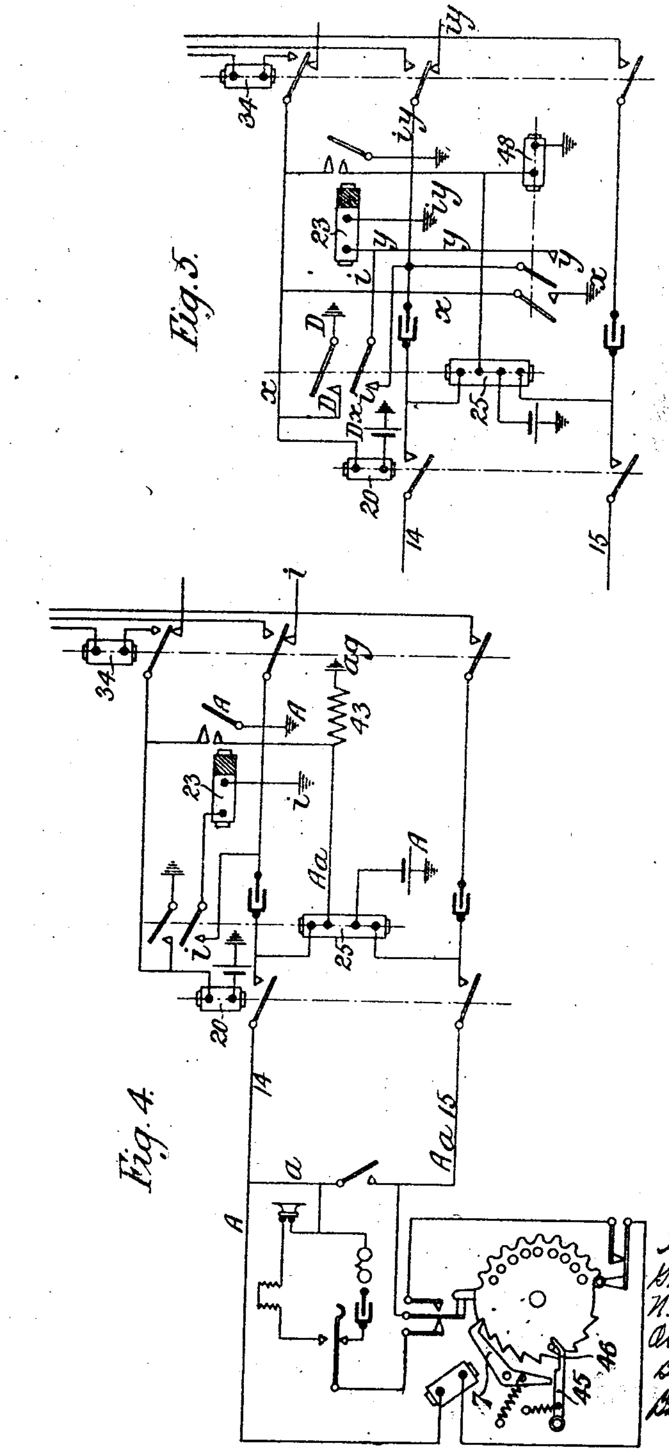
Figure 6:
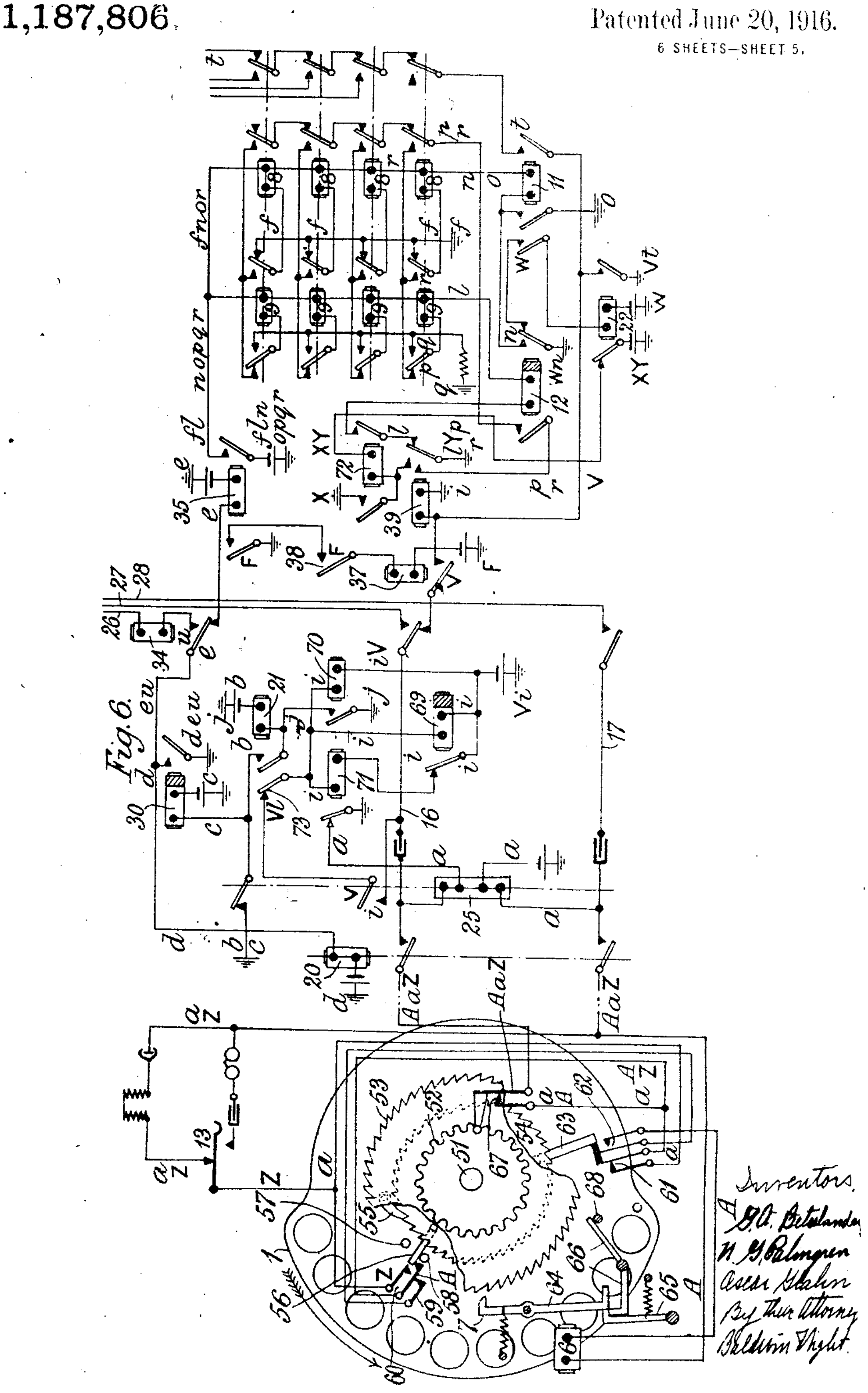
Figure 7:
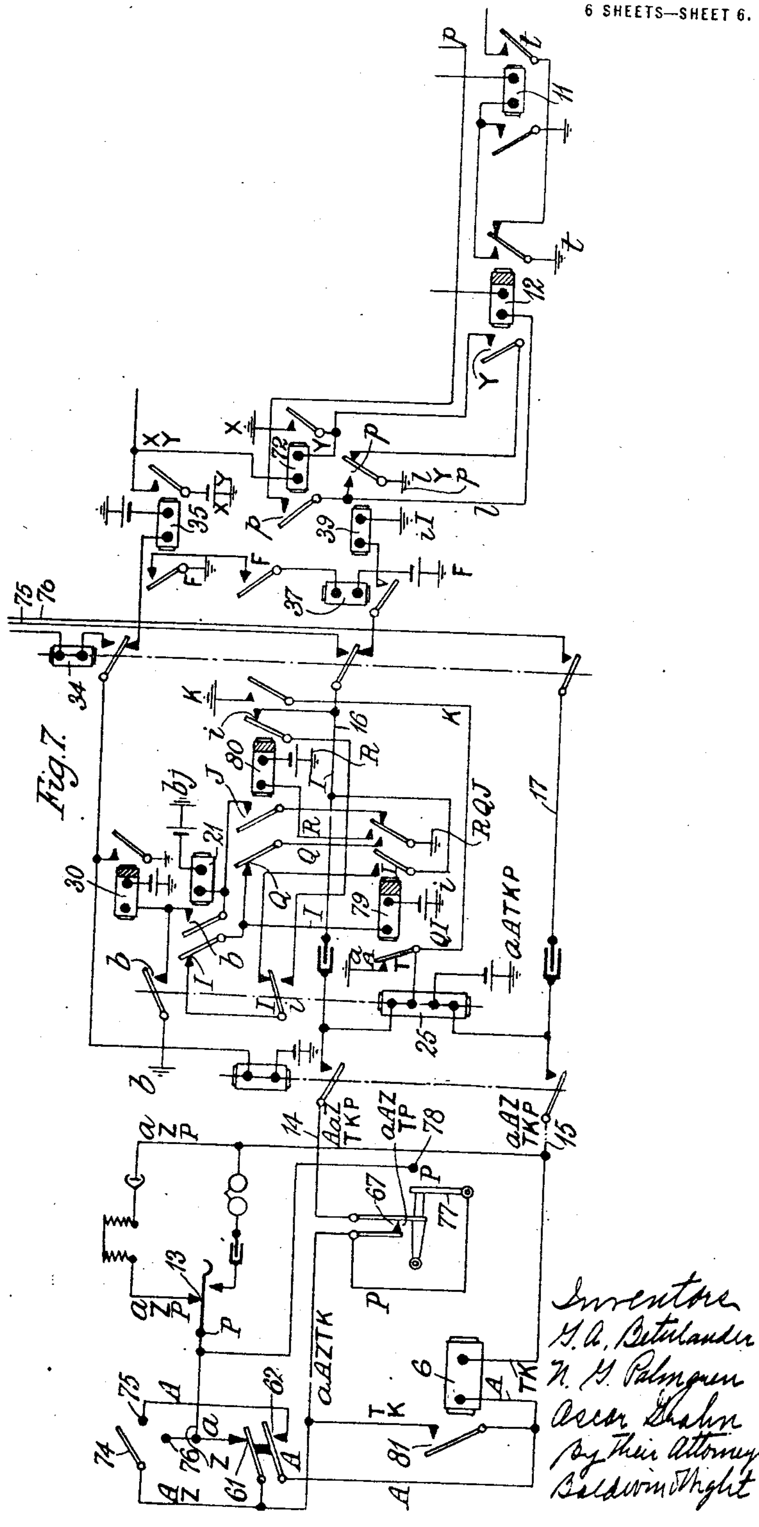

Figure 1 represents circuit arrangements for a reciprocal step by step control between a number-switch and a selector. Fig. 2 is a modification in which the number-switch is controlled step by step from an impulse sending device located at the exchange. Figs. 3, 4 and 5 show a modified form of the invention, the object of which is partly to simplify the controlling operations so that the number of relays and circuits required may be diminished, partly to heighten the adaptability of the system so that it may be suitable for lines of different resistances. Fig. 6 shows a modification in which the impulse transmitter is started from the exchange by a short interruption of the line circuit but having been thus started emits the impulses independently of the exchange. Fig. 7 shows a modification of the arrangement shown in Fig. 6.

The number-switch consists according to the arrangement shown in Figs. 1 to 5 of a finger dial 1 provided with impulse pins 2 actuating a contact device 3, 4 and with teeth 5.

6 is an electro-magnet actuating a double toothed pawl 7 which engages the teeth 5. After the dial has been set, it can only be returned to normal position by the action of the magnet 6 the pawl controlling the movement of the dial in such a manner that the latter is rotated half a tooth for each movement of the pawl.

The selector on the right of Fig. 1 is of known construction and consists of relays only, viz., a series of switching relays 8, a series of auxiliary relays 9 and two controlling relays 11 and 12.

For the purpose of establishing a wanted talking connection, the subscriber first removes his receiver from the hook 13, the receiver and transmitter being then in the ordinary way branched between the line wires 14 and 15. A circuit is thus closed, extending over both the line branches and through a line relay (not shown) located at the exchange. Said relay, upon operating, causes subscriber's line to be connected with an idle junction line 16, 17 through contacts 18, 19 of a connecting relay 20. The subsidiary means for effecting this connection are not shown as they are well known and of no importance for the present invention. The means for effecting the connection are described in a co-pending application for a United States Patent No. 832,471 and in the specification of British Patent No. 9840 of 1914. At the moment of connection relay 20 and an auxiliary relay 21 are simultaneously energized over circuits not shown in the drawing. A circuit *a* is thereby established operating subscriber's impulse relay 25 which closes circuit *b* locking relay 21 and circuit *c* energizing slow acting relay 30 which closes a holding circuit *d* for relay 20 so that though the circuits, by which relays 20 and 21 were energized, are immediately opened, these relays are maintained energized. Relay 30 closes circuit *e* energizing relay 35 which attracts its armature and prepares the circuit of a selector connecting relay 37.

In the drawings the invention is represented as applied to a system in which the selector is assigned in common to a plurality of junction lines 16, 17, though this is immaterial. In order to prevent the simultaneous connection of two or more subscribers to the common selector, a succession device is provided to control contacts 38 included in the circuits of the selector connecting relays 37 assigned to the different junction lines, in such a manner that only one subscriber at a time can be connected to the selector. If the selector is free, contact 38 is immediately closed, relay 37 being then energized whereby line branch 16 is connected through contacts 47 and 40 to an impulse relay 39, belonging to the selector. At the same time circuit *f* is closed extending from earth through back contacts of all auxiliary relays 9 and through all switching relays 8, which are thereby caused to operate.

All the operations hitherto described are completed within a very short period and before the subscriber has operated his number-switch. When the subscriber turns the dial, the receiver and transmitter are cut off at contact 26 and magnet 6 is cut in through contact 41. Magnet 6 is not, however, operated until the dial has been turned to the finger abutment, as, during the setting of the dial, a contact 42 is closed whereby magnet 6 is short circuited and the loop circuit is maintained closed. If, for instance, the dial is set for digit 4, contact spring 3 is on the top of the fifth pin 2 at the end of the movement of the dial. When the subscriber thereupon releases the dial, contact 42 is at first opened, magnet 6 is then supplied with current through contacts 3, 4 and 41 and, upon energizing, actuates pawls 7 so that the dial is allowed to rotate half a tooth. Contact 3, 4 is thus opened and consequently magnet 6 and impulse relay 25 release their armatures. The latter, upon deënergizing, opens circuit *b* causing relay 21 to release its armature. Slow acting relay 30, however, keeps its armature attracted preventing the talking connection from being broken. At the same time magnet 6 has released pawl 7 and the dial has therefore been rotated half a tooth more. When contact 3, 4 is thus again closed on the top of the next pin, a circuit *g* is closed through a resistance 43, relay 25, magnet 6 and the other winding of 25 to battery. As resistance 43 is now included in the loop circuit, the current is not strong enough to cause magnet 6 to operate pawl 7; relay 25 on the other hand attracts its armature.

If the selector is not immediately available, the number-switch, after having been turned back for one tooth, is maintained in its locked position. When the selector becomes idle, however, relay 37 is energized and completes circuit *h* through relays 23 and 39. Relay 23 operates, locks itself (circuit *i*) and cuts in relay 21 (circuit *j*). Although circuit *g* is then opened, yet the loop circuit is maintained closed through circuit *k*. Furthermore, relay 39 is energized, whereby circuit *l* is closed through relay 12, which, attracting its armature, locks itself through circuit *m*. Circuit *n* is then closed through relay 11. Relay 11 attracts its armatures and locks itself through circuit *o*. Further, upon the energization of relay 12, circuit *p* is closed through the first auxiliary relay 9, which therefore energizes and locks itself (circuit *q*) through a resistance 44. The first switching relay 8 is maintained energized by circuit *r*. Relay 9, upon energizing, closes circuit *s* whereby relay 49 is caused to operate. Circuit *i* is thus broken releasing relays 23 and 39, the latter, in releasing its armature, breaking circuits $r$ and $m$. The first relay 8 immediately releases its armature thereby opening circuit $s$ of relay 49, while slow acting relay 12 keeps its armature attracted. When relay 23 releases its armature, relay 21 is maintained energized by circuit $b$. Resistance 43 is therefore again short-circuited by circuit A and consequently the line current is strengthened so that magnet 6 is caused to operate pawl 7. The dial is thereby released and is rotated half a tooth. Contact 3, 4 is again opened whereby magnet 6 and impulse relay 25 are deënergized.

The operation is then repeated in a similar manner. Relay 21 releases its armature and cuts in resistance 43 so that, when contact 3, 4 is again closed, magnet 6 cannot be operated immediately. The releasing of relay 21 re-prepares circuit $h$ through relays 23 and 39, said circuit being completed when contact 3, 4 is closed and relay 25 is thereby again energized. The second impulse now operates the second pair of relays 8 and 9 in the same manner as described in respect of the first pair, the current now passing through back contact of first relay 8 and working contact of second relay 8. Second relay 9, upon attracting its armature, closes the circuit of relay 49 which operates and opens circuits $h$ and $i$ of relays 23 and 39. Resistance 43 is then short circuited whereby the line current is strengthened and magnet 6 is caused to operate and so on.

From the above description it can be seen that the number-switch and the selector mutually control each other step by step in such a manner that the number-switch cannot take a new step until the selector has shifted correspondingly, and vice versa. The last pin 2 having passed and contact 3, 4 having been opened, the dial is rotated, as before, half a tooth more, contacts 26 and 41 being then operated, so that magnet 6 is cut off and the receiver and transmitter are again bridged across the line branches. The loop circuit is therefore closed through the receiver and transmitter. Relay 23 attracts its armature and emits the last impulse to the selector. Relay 23 having released its armature, circuits $h$ and $i$ remain open and consequently no further impulses can be emitted. After a short interval the slow acting relay 12 therefore releases its armature, closing circuit $t$ to a switching device (not shown) adapted to effect, in a known manner, the testing of the junction lines belonging to the group selected and then to send a current through a connecting relay 34 associated with an idle junction 27, 28 by means of which the line 16, 17 may be connected to said idle junction. Relay 34, upon energizing, cuts itself in a known manner into a locking circuit $u$ which may lead to a relay 35 in the second stage [illegible] same time circuit $e$ is opened. Relay 35 deënergizes and opens in its turn circuit F. Relay 37 deënergizes restoring the selector to its normal condition. On the next operation of the dial, a selector of the next selecting stage is operated in a similar manner. Upon putting back the receiver after the termination of the conversation, the loop circuit is opened. The talking connection is then disconnected by relay 30, releasing its armature and opening the locking circuits of the connecting relays 20 and 34.

In the arrangement shown in Fig. 2 the number-switch and the selector do not work in mutual dependence of each other, as in Fig. 1, but in time with an impulse sending device located at the exchange and represented in the drawing by a rotating interrupter 50. The impulse relay 23 is here operated by circuit H from the rotating interrupter in the same manner as by circuit $h$ from the selector in Fig. 1. At the same time impulses are sent to the selector over circuit I. After the dial has reached its normal position, relay 21 remains current carrying by circuit $b$ and consequently circuits H and I are kept open, so that the sending of impulses to the selector ceases.

Fig. 3 agrees with Fig. 1 inasmuch as the releasing of the impulse transmitter is effected step by step by strengthening the line current. The impulse transmitter is unaltered except that the contact springs 3, 4 normally occupy another position. The selector shown to the right is also the same inasmuch as the same relays are used; but the relays 23 and 49 work differently. The relay group located between the impulse transmitter and the selector and serving to transmit the controlling impulses is considerably simplified. This has been rendered possible according to the invention by the selector affecting the line circuit by means of the impulse relay 23 in such a manner that the changing of the line circuit necessary for releasing the impulse transmitter is effected independently of the manipulation of the impulse transmitter, that is, whether the subscriber has set the transmitter or not.

At the end of the setting movement of the dial the contact spring 3 is between two teeth 2, contact 3, 4 being then closed. If the selector is not disengaged at the time, the dial is stopped in set position as resistance 43 is then included in circuit $g$. As soon as the selector is idle, contact 38 of the succession device already referred to is closed; relay 37 being then energized closes circuit $k$ of relays 23 and 39 which attract their armatures. Relay 39 closes circuit $l$, relay 12 thereupon attracting its armature and preparing circuit N of relay 11 and circuit $p$ of the [illegible] auxiliary relay 8. Relay 23 [illegible] complete[illegible] circuit [illegible] operate [illegible] acting relay 30 which during the sending of the impulse keeps third wire 32 connected to earth. Further, relay 23 short circuits resistance 43 by circuit A, the dial being thereby released. When the dial has been turned half a tooth, contact 3, 4 is opened, magnet 6 then releasing pawl 7 so that the dial is permitted to rotate another half tooth. As contact 3, 4 is opened also relay 25 releases its armature and circuit *l* of relays 23 and 39 is opened.

When relay 39 deënergizes, an impulse is sent partly by circuit N to relay 11, partly through the first auxiliary relay 9 by circuit *s* and partly through slow acting relay 12 over circuit M. Upon the next interruption of the line circuit an impulse is sent in similar manner through the second auxiliary relay 9, and another impulse through relay 12. In this manner the operation is continued till the dial reaches its normal position, when the circuit of relays 23 and 39 is again closed. As relay 39 now keeps its armature attracted, slow acting relay 12 no longer receives current and therefore releases its armature after a short interval. An impulse is then sent over circuit *t* causing the energization of relay 34 in the manner already described. Further, a circuit S is completed through relay 49 whereby the circuit of relays 23 and 39 is opened. After a moment slow acting relay 30 releases its armature, the third wire 32, however, being kept in connection with earth over circuits D and V.

If the selector is immediately available the strengthening of current can be effected before the dial is set; but magnet 6 cannot be effected until the dial has been set as until then it is bridged first at contact 41 and then at contact 42.

The speed of operation may be regulated, if required, by relay 23 being made slow acting to a suitable degree. A further simplification of the controlling system may be obtained if the impulse transmitter is only started from the exchange and is then allowed to work in the ordinary way without any electro-magnetic control.

The object of controlling the operation of the impulse transmitter from the exchange is, as is well known, to check the impulse sending when a selector or a junction is not available immediately. At the same moment when the selector or the junction is made available an impulse is emitted causing the interruption of the line circuit through which the impulse transmitter is started. In order that the starting impulse may not be emitted before the subscriber has set his transmitter, the impulse sending is controlled according to this invention from the selector side in such a manner that the starting of the impulse transmitter is rendered possible only through a variation of the current of the line circuit effected at the subscriber's station, said variation of current consisting either in an interruption of the current or on an alteration of the strength of the current. To this end the impulse transmitter is preferably so constructed that the preparatory variation of current is effected in setting the transmitter or in the beginning of its returning movement. Such an arrangement is represented in Fig. 4, the selector being omitted. The impulse relay 23 may here be slow acting so that relay 30 can be dispensed with. The dial has a single toothed pawl 7 cooperating with a lever 45 in such a manner that, after having once released the dial, it is held in the releasing position while the dial reaches its normal position when a pin 46 carried by the dial actuates lever 45 so that pawl 7 is liberated.

As soon as the selector is idle, relay 23 is operated as before, resistance 43 being then short circuited (circuit A) so that magnet 6 operates and releases the dial. The latter then returns to normal independently of the connecting operations at the exchange, the movement of the dial being regulated in the ordinary way by means of a governor.

In order that the described circuits may be suitable without alterations for subscriber's lines of different resistances, the resistance 43 must be chosen without limits which are determined on the one side by the condition that magnet 6 must not operate for the minimum line resistance with resistance 43 included in the line circuit, and on the other side by the condition that relay 25 shall operate for the maximum line resistance with resistance 43 included in the line circuit. It is however, obvious that the lower the resistance 43 is put, the higher the line resistance may be under otherwise equal conditions. Thus, if the highest possible line resistance is to be used, resistance 43 must be chosen close to the first of the limits stated above. In this instance, however, resistance 43 is considerably higher than the resistance of the windings of relay 25. The latter resistance must be such as to admit a microphone current of sufficient strength. This relation between the resistance is now utilized according to the invention for rendering it possible to use still higher line resistances. For that purpose resistance 43 forms, as shown in Fig. 5, the winding of a relay 48, closing circuits *x* and *y* in parallel with circuits D and *t*. As relay 48 has a higher resistance and therefore has a larger number of ampere turns than relay 25 the former can evidently work for a higher line resistance than the latter. Thus upon a call either relay 48 only or both relays 48 and 25 will at first operate according as the resistance of the calling line is high or low. When the line is then connected to the selector, relay 48 is short circuited (as described in connection with resistance 43 in Fig. 1) so that it releases its armature and at the same time relay 25 attracts its armature owing to the strengthening of the current, provided, of course, that it has not already operated.

The described arrangement considerably extends the limits for the use of the system in installations wherein the line resistances vary within wide limits. The arrangement may of course also be applied to a system according to Fig. 3.

Fig. 6 represents a connection between a subscriber's number-switch and a group selector in which the starting of the impulse transmitter is effected from the exchange by a short interruption of the line circuit; the impulse transmitter having once been started operates in the usual manner and sends the impulses independently of the operations of the exchange. The construction of the transmitter is immaterial. Ordinary dial apparatus as well as apparatus in which the whole number is set up before the starting of the apparatus may be used. In apparatus of the latter type the electro-magnet stopping device is preferably so adapted as to stop and to release the apparatus for every series of impulses.

The impulse sender is of the usual dial type and is shown from behind with all the parts in normal position, the construction being only diagrammatically represented. It comprises a finger dial 1 firmly connected with a shaft 51 which is coupled in known manner with a governor (not shown). The shaft is acted upon by a spring tending to turn it clockwise. Loosely mounted on the shaft are an impulse disk 52 and two ratchet disks 53 and 54. The impulse disk and the ratchet disk 53 are firmly connected together while both ratchet disks are coupled together by means of a pawl 55 so that the ratchet disk 53 is always carried along in one direction only. The finger dial and the ratchet disk 54 are coupled together by means of an arm 56 projecting from the ratchet disk and two pins 57 and 58 fixed to the dial in such a manner that the dial has a certain amount of free movement in relation to the ratchet disk. The impulse disk is stopped in a set position by an electro-magnetic stopping device coöperating with the ratchet disk 53 and consisting of an electro-magnet 6 and a pawl 7 operated by said magnet. The parts shown in section are to be regarded as attached to the frame of the apparatus.

At the moment of connection relays 20 and 21 are energized simultaneously over working circuits not shown. A circuit a is thereby established through relay 25 to the negative pole of the battery. Relay 25 therefore attracts its armature, relay 21 being thus cut into a locking circuit b. At the same time circuit c through slow acting relay 30 is completed and closes locking circuit d for relay 20. Though the above mentioned working circuits of relays 20 and 21 are immediately opened, said relays remain in working position on account of their locking circuits.

Relay 30 attracting its armature closes circuit e through relay 33 which energizes and prepares circuit f of a selector connecting relay 37. The selector is as before arranged in common for a number of junctions 16, 17 and consequently a sequence controller is provided controlling contacts 38 in the circuits of such selector connecting relays so that only one subscriber at a time may be connected to and operate the selector. It may now be presumed that the selector is immediately available. Consequently contact 38 will be closed immediately after the [illegible] of the selector relay 37 being [illegible]. The latter causes the connection of junction 16 with an impulse receiving relay 39 belonging to the selector. The operation of relay 33 also closed circuit g through all switching relays 8 to battery causing relays 8 to attract their armatures.

All the operations hitherto described are completed in a very short period and before the subscriber has operated the dial. When the dial is then set by turning the same in the direction of the arrow, it does not carry with it the ratchet disk at once and consequently a set of contacts 59, 60 is disengaged, but without any alteration of the current conditions. Only when pin 57 engages arm 56 is disk 54 carried around, a set of contacts 61, 62 normally acted upon by an arm 63 projecting from disk 54, being then disengaged. Although contact 61 is thereby opened yet the transmitter and receiver are maintained in the line circuit through contact 60 (circuit Z). When the dial has been set and is released it returns immediately, at first, however, without carrying with it disk 54. During this free movement the set of contacts 59, 60 is operated in such a manner that contact 60 is opened a moment before contact 59 is closed. Circuit Z is thereby opened for a moment so that relay 25 releases its armature and opens the locking circuit b of relay 21. The latter releases its armature and prepares circuit i of impulse relay 39 of the selector. The slow acting relay 30, however, keeps its armature attracted, thereby preventing the disconnecting of the talking connection. Immediately before pin 58 engages arm 56 contact 59 is closed whereby circuit k is established through magnet 6 and relay 25, causing these to attract their armatures. Magnet 6 then causes pawl 7 to engage disk 53 thereby stopping the [illegible] as soon as pin 58 engages arm 56. The pawl 7 has a tail 64 coöperating with two levers 65 and 66 in such a manner that, when pawl 7 it attracted, lever 66 is allowed to move its end into the path of lever 65 so that the stopping action of the latter is neutralized.

When relay 25 again attracts its armature circuit *i* is closed through relay 39 and further parallelly partly through relays 69 and 70, partly through relay 71. Relay 70 does not operate immediately as it is adapted to work only on a stronger current, while relays 69 and 71 attract their armatures at once. Next moment, however, relay 71 again deënergizes, as its circuit is opened by relay 69. The latter is slow acting and therefore keeps its armature attracted. Relay 39 attracts its armature at the same time as relays 69 and 71, auxiliary relay 72 being then cut in through circuit Y. Relay 72 closes locking circuit X and prepares circuit *l* of relay 12. The energizing of relay 71 causes a short interruption of the line circuit. This causes magnet 6 to release pawl 7, lever 66 then moving its end behind tail 64, so that pawl 7 can no longer be attracted by magnet 6. When pawl 7 is moved out of its stopping position, the dial is released and the whole mechanism is carried with it, contacts 67 being then opened a certain number of times corresponding to the digit set. Relay 71 is so constructed that it does not release its armature until contact 67 has been opened for the first time. At the same time as magnet 6 releases, relay 25 also releases its armature, relay 39 being then deënergized. The latter, upon releasing its armature, completes circuit *l* already prepared through relay 12 which, attracting its armature, closes circuit *n* of relay 11. Relay 11 locks up through circuit *o*. When contact 67 is then again closed, relay 25 is again energized to complete circuit *i* again through relay 39, whereby relay 39 is caused to attract its armature. Relay 12, being slow acting, keeps its armature attracted although its circuit *l* is opened. Owing to this fact circuit *p* is established extending through first auxiliary relay 9. Relay 9 operates and cuts itself into a locking circuit *q* in the manner already described. By the next opening of the impulse contact 67 of the dial, circuit *i* is again opened, relay 39 then releasing its armature. Circuit *r* of relay 8 is consequently opened and at the same time relay 12 receives a new impulse through circuit *l*. By the next closing of the line circuit the selector receives a new impulse operating the second pair of relays 8, 9, the current this time passing through the back contact of first relay 8. For every following impulse another pair of relays 8, 9 is operated in a similar manner.

When the dial reaches its normal position the last closing of the line circuit is effected. At the same time the set of contacts 61, 62 is operated, magnet 6 being then cut off by the opening of contact 62 while the receiver and the transmitter are cut in through contact 61. The changing of the circuits is effected without opening the line circuit. When the dial reaches its normal position lever 66 is actuated by a pin 68 so that it is swung out of its stopping position permitting tail 64 and lever 65 to be returned to the positions shown in the drawing. The last closing of the line circuit causes in the above described manner relay 39 to attract its armature, a corresponding pair of relays 8, 9 being thereby operated. As relay 39 now remains energized during a longer period, relay 12 finally releases its armature, the circuit of the last switching relay 8 being thus opened. At the same time relay 22 receives current over circuit W, circuit X of relay 72 being then opened. In addition impulse relay 39 is short circuited by circuit V, whereby a strengthening of current is effected, causing relay 70 to attract its armature, completing circuit *j* through relay 21 which attracts its armature and locks itself through circuit *b*. At the same time relays 39 and 70 are cut off at contact 73. Upon the energization of relay 22 a circuit *t* is closed to perform the necessary switching operations already described whereby relay 34 is to be energized by means of which junction 16, 17 is to be connected with a disengaged junction 27, 28 of the selected group. The connecting relay 34, upon energizing, cuts itself in a known manner into locking circuit *u* leading over the third wire. At the same time the circuit of relay 35 is opened whereby the selector is restored to normal.

By the next operation of the dial a selector of the next group selecting section is affected in a similar manner. When the subscriber puts back the receiver on the termination of the conversation, the line circuit is opened, the talking connection being then interrupted by relay 30 releasing its armature and opening the locking circuits of the connecting relays.

If in the example described above the dial has been set but the selector is not immediately available, the impulse mechanism remains in its stopped position after the dial has been turned back against the arm 56. As soon as the selector is disengaged, contact 38 is, however, closed so that the dial is started and the selector is operated in the manner described above. Instead of defeating the action of magnet 6 by means of lever 66, as in the example described, magnet 6 may of course be cut out of the line circuit, for instance, by means of lever 66.

Fig. 7 shows a modification of the arrangement represented in Fig. 6, the dial being omitted and only the circuits shown. The contacts 61 and 62 are operated in the same manner as in Fig. 6. Instead of the contacts 59 and 60 of Fig. 6. a contact device is used and is represented diagrammatically by a contact arm 74 and two contacts 75 and 76. The closing of the contacts 74, 75 and 76 is effected as in Fig. 6 during the free movement of the dial which is limited by the pins 57 and 58 of Fig. 6. In addition, the dial is provided with a contact device 77, 78 operated by the impulse disk in such a manner that contact 77, 78 is closed at the first opening of the impulse contact 67 and then remains closed until the dial reaches its normal position when contact 77, 78 is again opened by the action of the dial. In this arrangement levers 65 and 66 are omitted. In other respects the construction of the dial is unaltered.

When the receiver is lifted, it and the microphone are as before bridged across the line branches through contacts 61 and 67. When the dial is then set contact 74, 75 is first closed for a moment, but without changing the current conditions. Immediately before the pin engages the arm 56 (Fig. 6) contact 74, 76 is closed. By continuing the turning of the dial, contact 61 is opened and contact 62 is closed, the receiver and the microphone being after this maintained connected between the line branches through contact 74, 76 (circuit Z) till the dial, after having been set, is released, when contact 74, 76 is first opened and then contact 74, 75 is closed for a moment. Upon the opening of contact 74, 76 relay 25 deënergizes, locking circuit $b$ of relay 21 being then opened so that relay 21 releases its armature. At the following momentary closing of contact 74, 75 line circuit A is closed this time, however, through magnet 6, the latter locking itself through circuit T and retaining the impulse mechanism immediately before pin 58 engages the arm 56 (Fig. 6). As soon as the selector becomes idle, relay 37 is energized, as previously described, thereby completing circuit $l$ through impulse relay 39 and a slow acting relay 79 which becomes energized. Relay 39 closes circuit $l$ of slow acting relay 12. Relay 79 cuts in relay 80 through circuit R and short circuits relay 39 through circuit Q, relay 39 then releasing its armature and cutting in relay 72 through circuit Y. Relay 72 locks itself through circuit X and remains energized until relay 35 releases its armature. Upon the energization of relay 79, line circuit T is opened, magnet 6 then deënergizing and releasing the impulse mechanism. At the same time a circuit K, parallel with circuit T, is closed. The line circuit is, however, not closed at once as contact 81 of magnet 6 is now open. Upon opening the line circuit also relay 25 releases its armature closing circuit I through impulse relay 39 and relay 79. Relay 39 consequently again energizes whereby circuit $p$ is completed to the selector. By this impulse the first pair of relays 8, 9 is operated in the manner above described. At the same time slow acting relay 12 receives a new impulse, (circuit $l$). Immediately after the impulse contact 67 of the dial is opened and at the same time contact 77, 78 is closed. When, after this, contact 67 is closed, a circuit $p$ is established through relay 25 which energizes and opens circuit I. Upon the next interruption of the line circuit at contact 67, circuit I of relay 39 is again closed by relay 25, the selector then receiving its second impulse. In this manner the operation is continued until the dial reaches its normal position when the line circuit is closed for the last time. At the same time contacts 77, 78 and 62 are opened and contact 61 is closed.

As slow acting relay 79 now remains deenergized, it releases its armatures after a short period, relay 21 then receiving current over circuit J and locking itself through circuit $b$. Immediately after slow acting relay 80 releases its armatures. In the meantime also slow acting relay 12 of the selector has released its armature and has completed circuit $t$ to the above mentioned switching device by which a disengaged junction of the group wanted is selected and connecting relay 34 is operated.

In comparison with Fig. 6 this arrangement has the advantage among others that the interruption of the line circuit effected from the selector does not need to be carefully adapted with regard to the condition that the line circuit, after having once been opened, must not be closed again before impulse contact 67 has been opened. This is attained, according to Fig. 7, by magnet 6, upon releasing its armature, immediately opening contact 81 included in the line circuit. After this the line circuit cannot be closed until contact device 77, 78 has been actuated. Fig. 7 also has simpler circuits inasmuch as relays 71 and 69 of Fig. 6 are dispensed with.

What we claim is:—

1. In a telephone system, the combination of selectors, impulse transmitters adapted to control the selectors, impulse relays adapted to be operated by variations of the line current and to control the setting of the selectors, electro-magnetic means adapted to be operated by other variations of the line current for controlling the impulse transmitters, and means for varying the line current.

2. In a telephone system, the combination of selectors, impulse transmitters adapted to control the selectors, impulse relays adapted to be operated by interruptions of the line current and to control the setting of the selectors, electro-magnetic means adapted to be operated by variations of the line current for controlling the impulse transmitters, and means for varying the live current.

3. In a telephone system, the combination of a selector, a number-switch adapted to control the selector, an impulse sending device located at the exchange and adapted to control the number-switch, an impulse relay adapted to be operated by a variation of the line current and to control the impulse sending device, an electro-magnet adapted to control the number-switch, means whereby the magnet is prevented from operating a second time until the number-switch has moved one step, and means for varying the line current.

4. In a telephone system, the combination of a selector, a number-switch adapted to control the selector, an impulse sending device located at the exchange and adapted to control the number-switch, an impulse relay adapted to be operated by variations of the line current, an electro-magnet adapted to be operated by other variations of the line current and to control the number-switch, and means for varying the line current.

5. In a telephone system, the combination of a selector, a number-switch adapted to control the selector, an impulse sending device located at the exchange and adapted to control the number-switch, an impulse relay adapted to be operated by variations of the line current, an electro-magnet adapted to be operated by other variations of the line current and to control the number-switch, a resistance in the line circuit, and means for short circuiting such resistance.

6. In a telephone system, the combination of a selector, a number-switch adapted to control the selector, an impulse sending device located at the exchange and adapted to control the number-switch, a resistance in the line circuit, an auxiliary relay adapted to short circuit such resistance, and an impulse relay adapted to be operated by variations of the line current and to control both the impulse sending device and the circuit of the auxiliary relay.

7. In a telephone system, the combination of a selector, a number-switch adapted to control the selector, an impulse sending device located at the exchange and adapted to control the number-switch, a resistance in the line circuit, an auxiliary relay adapted to short circuit such resistance, an impulse relay adapted to be operated by variations of the line current and to control both the impulse sending device and the circuit of the auxiliary relay, and means whereby the selector controls this last circuit.

8. In a telephone system, the combination of a selector, a number-switch adapted to control the selector, an impulse sending device located at the exchange and adapted to control the number-switch, an impulse relay adapted to be operated by variations of the line current, an electro-magnet adapted to be operated by other variations of the line current and to control the number-switch, and means for varying the line current independently of the movements of the number-switch.

9. In a telephone system, the combination of a selector, a number-switch adapted to control the selector, an impulse sending device located at the exchange and adapted to control the number-switch, a resistance in the line circuit, an auxiliary relay adapted to short circuit such resistance independently of the movements of the number-switch, and an impulse relay adapted to be operated by variations of the line current and to control both the impulse sending device and the circuit of the auxiliary relay.

10. In a telephone system, the combination of a selector, a number-switch adapted to control the selector, an impulse sending device located at the exchange and adapted to control the number-switch, an impulse relay adapted to be operated by variations of the line current, an electro-magnet adapted to be operated by other variations of the line current and to control the number-switch, a relay included in the line circuit, and means for short circuiting such relay.

11. In a telephone system, the combination of a selector, a number-switch adapted to control the selector, an impulse sending device located at the exchange and adapted to control the number-switch, a relay included in the line circuit, an auxiliary relay adapted to short circuit such relay, and an impulse relay adapted to be operated by variations of the line current and to control both the impulse sending device and the circuit of the auxiliary relay.

12. In a telephone system, the combination of a selector, a number-switch adapted to control the selector, an impulse sending device located at the exchange and adapted to control the number-switch, a relay included in the line circuit, an auxiliary relay adapted to short circuit such relay, an impulse relay adapted to be operated by variations of the line current and to control both the impulse sending device and the circuit of the auxiliary relay, and means whereby the selector controls this last circuit.

13. In a telephone system, the combination of a selector, a number-switch adapted to control the selector, an impulse sending device located at the exchange and adapted to control the number-switch, an impulse relay adapted to be operated by variations of the line current, an electro-magnet adapted to be operated by other variations of the line current and to control the number-switch, a relay included in the line circuit and adapted to control contacts in parallel with the contacts of the impulse relay, and means for short circuiting such relay.

14. In a telephone system, the combination of a selector, a number-switch adapted to control the selector, an impulse sending device located at the exchange and adapted to control the number-switch, a relay included in the line circuit, a slow acting auxiliary relay adapted to short circuit such relay, and an impulse relay adapted to be operated by variations of the line current and to control both the impulse sending device and the circuit of the auxiliary relay.

GOTTHILF ANSGARIUS BETULANDER
NILS GUNNAR PALMGREN.
OSCAR GRAHN.